United States Patent
Gabriel

(10) Patent No.: US 6,464,487 B2
(45) Date of Patent: Oct. 15, 2002

(54) INJECTION-MOULDING TOOL FOR THE PRODUCTION OF INFORMATION CARRIERS IN DISC FORM

(75) Inventor: Markus Gabriel, Buttwil (CH)

(73) Assignee: AWM Mold Tech AG, Muri (CH)

(*) Notice: Subject to any disclaimer, the term of this patent is extended or adjusted under 35 U.S.C. 154(b) by 0 days.

(21) Appl. No.: 09/731,067

(22) Filed: Dec. 7, 2000

(65) Prior Publication Data

US 2002/0031570 A1 Mar. 14, 2002

(30) Foreign Application Priority Data

Jan. 27, 2000 (CH) .................................... 2000 0161/00

(51) Int. Cl.$^7$ ............................................. B29C 45/44
(52) U.S. Cl. ...................... 425/542; 264/107; 425/810
(58) Field of Search ................ 425/542, 810; 264/106, 107

(56) References Cited

FOREIGN PATENT DOCUMENTS

| DE | 44 10 0150 A1 | 10/1994 |
|---|---|---|
| WO | WO 99/37471 | 7/1999 |

OTHER PUBLICATIONS

Hackh's Chemical Dictionary, 1969, p. 663.*

* cited by examiner

*Primary Examiner*—Tim Heitbrink
(74) *Attorney, Agent, or Firm*—Morgan, Lewis & Bockius LLP

(57) ABSTRACT

An injection-moulding tool (10) for the production of information carriers in disc form, in particular in the form of CDs and/or DVDs, comprises for the forming of an injection mould (25) a first and a second mirror block (11 and 12, respectively), which lie opposite each other and are movable in relation to each other for opening and closing the mould and also a form ring (20), which concentrically encloses the first mirror block (11) and closes off the injection mould (25) towards the outer edge and is movable in relation to the first mirror block (11), a sliding ring (21; 21a,b,c) for reducing the friction when there is a movement of the form ring (20) in relation to the first mirror block (11) being provided between the first mirror block (11) and the form ring (20) enclosing it. The sliding ring (21; 21a,b,c) is arranged concentrically between the first mirror block (11) and the form ring (20) enclosing it. The use of such an injection mould allows the production of information-carrier discs of a particularly high quality in a simple way.

12 Claims, 2 Drawing Sheets

INJECTION-MOULDING TOOL FOR THE PRODUCTION OF INFORMATION CARRIERS IN DISC FORM

TECHNICAL FIELD

The present invention relates to the field of injection-moulding technology. It concerns an injection-moulding tool for the production of information carriers in disc form.

Such an injection-moulding tool is known, for example, from the printed document WO-A1-99/37471.

PRIOR ART

For producing optically readable information carriers such as audio CDs, CD-ROMs, video CDs or DVDs, injection-moulding tools which form an injection mould by means of two (cylindrical) mirror blocks lying opposite each other and movable in relation to each other are used. On one of the two mirror blocks there is usually releasably fastened a thin, disc-shaped stamper, which stamps the tracks containing the information during the injection moulding of the information carrier being formed. At the outer edge, the injection mould is often bounded by a form ring, which concentrically surrounds one of the mirror blocks.

The form ring projects beyond the planar moulding surface of the mirror block enclosed by it and is displaceable in relation to this mirror block in the axial direction. If the injection mould is closed by an axial movement of the two mirror blocks towards each other, the form ring comes to rest on the opposite mirror block on account of the projection and closes the mould, while the mirror block concentrically enclosed by it is at a predetermined distance from the opposite mirror block. The hot plastic is then infected under high pressure into the disc-shaped cavity formed in this way. Once the cavity of the injection mould has been filled, the mirror block enclosed by the form ring is moved a little towards the other mirror block—in order to achieve a high quality of the information carrier—, while the form ring remains fixed in place (see in this respect FIGS. 2 and 3 of WO-A1-99/37471, cited at the beginning).

However, the relative movement taking place in this phase of the production process between the mirror block and the form ring enclosing it gives rise to problems for the following reasons: in order that the form ring can slide freely over the mirror block during the relative movement, a certain fit is necessary. If this fit is too large, plastic can get into the gap during injection and forms undesired flash on the moulded information carrier disc. If, on the other hand, the fit is too close, excessive friction values may occur, in particular if the mirror block and form ring are at different temperatures, hindering the relative movement and—because both parts are generally made of steel—possibly leading to seizing or jamming of the form ring on the mirror block.

In order to ensure a low sliding friction between the mirror block and the form ring when there is a relatively close fit, it has already been proposed in WO-A1-99/37471, cited at the beginning, to provide the surfaces sliding on one another of the mirror block and the form ring with a special coating which reduces the friction. However, it is disadvantageous in this case that the coating of the parts entails high expenditure, and that the coating generally influences the heat removal from the injection mould.

In EP-A1-0 899 075, to ensure a good relative mobility between a mirror block and a ring concentrically enclosing the mirror block, a linear ball bearing (75 in FIG. 5) is provided between the two parts. However, in this case the ring is not a form ring, which forms part of the injection mould, but a guide ring, which assists the centering of the two mirror blocks with respect to each other.

Finally, U.S. Pat. No. 5,018,962 discloses an injection-moulding tool, comprising two mirror blocks and a form ring, for the production of CDs, in which a concentric retaining ring (15 in FIG. 1) for the stamper resting on one of the mirror blocks is provided between the form ring and the said mirror block. During opening and closing, the form ring slides over both mirror blocks. However, special precautions for reducing the friction during these sliding processes are not taken.

SUMMARY OF THE INVENTION

It is therefore the object of the invention to provide an injection-moulding tool for the production of information carriers in disc form which avoids the disadvantages of known injection-moulding tools and is distinguished in particular by simplified production, can be used unproblematically and flexibly and makes possible the production of information carrier discs of a particularly high quality.

The object of the invention is achieved by the injection moulding tool comprising an injection mould, a first and a second block, which lie opposite each mould, and a form ring, which concentrically encloses the first edge and is movable in relation to the first mirror block, means for reducing the friction when there is a movement of the form ring in relation to the first mirror block being provided between the first mirror block and the form ring enclosing it, characterized in that the means comprise a sliding ring arranged concentrically between the first mirror block and the form ring enclosing it. The essence of the invention is to provide between the parts sliding over one another of the injection-moulding tool, to be specific the first mirror block and the form ring enclosing it, a special sliding ring which prevents direct friction between the mirror block and the form ring. Since the sliding ring is a separate component, if need be it can easily be exchanged or replaced, without having to change the change the other parts of the injection-moulding tool; in a corresponding way, a free choice of the material of the sliding ring allows the sliding properties to be optimized. Since the sliding ring inevitably forms part of the injection mould at the edge, the form of the injection-moulded part can be influenced by suitably shaping and selection. Finally, it is possible by a specific choice of the material of the sliding ring, to improve the heat removal in the edge region of the injection mould.

A first preferred embodiment of the injection-moulding tool according to the invention is distinguished in that the sliding ring consists of a material reducing the sliding friction, in particular of copper, a copper alloy such as bronze or else a plastics material such as Teflon. As a result, equally good sliding properties and good thermal conductivities can be realized in the edge region of the injection mould. The sliding ring can also be provided with a friction-reducing coating, for example a PVD coating (PVD= physical vapour deposit).

Influencing the form of the injection-moulded part by corresponding shaping of the sliding ring according to the invention can be achieved in various ways: if the first mirror block bounds the injection mould with an essentially planar surface, and the sliding ring adjoins the planar surface of the first mirror block with its end face facing the injection mould in such a way that it is flush with it, and enlarges it towards the outside, an injection-moulded part with a planar underside up to the outer edge is obtained.

If, on the other hand, the sliding ring has a bevel on its end face facing the injection mould in such a way that the information carrier produced in the injection mould has a chamfer at its outer edge, the injection-moulded part is correspondingly provided with a chamfer.

If, finally, the sliding ring has a peripheral depression on its end face facing the injection mould in such a way that the information carrier produced in the injection mould has an elevated, annular scratch guard at its outer edge, the injection-moulded part is correspondingly provided with a scratch guard in the form of an annular bead.

Further embodiments emerge from the dependent claims.

BRIEF EXPLANATION OF THE FIGURES

The invention is to be explained in more detail below on the basis of exemplary embodiments in conjunction with the drawing, in which.

WAYS OF CARRYING OUT THE INVENTION

Figure 1:
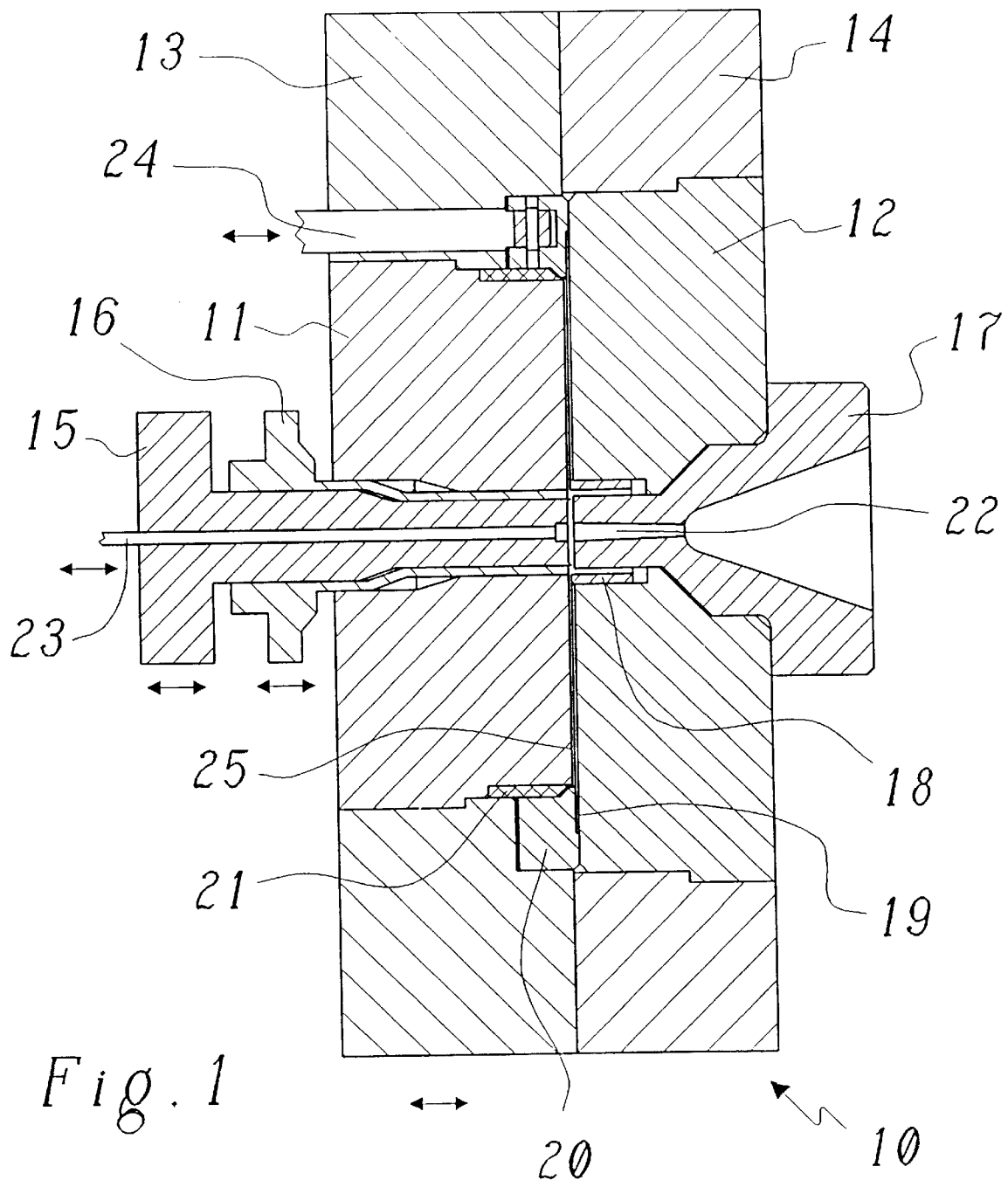
FIG. 1 shows in a longitudinal section a preferred exemplary embodiment of an injection-moulding tool according to the invention in a simplified representation.

In FIG. 1, a preferred exemplary embodiment of an injection-moulding tool according to the invention is reproduced in a longitudinal section. The figure is in this case simplified to the extent that the necessary screw fittings, springs, seals and operator-control elements have not been represented. The injection-moulding tool 10, shown in the closed state, comprises a central component, a first (left) mirror block 11, a second (right) mirror block 12 and a form ring (venting ring) 20 concentrically enclosing the first mirror block 11, which together form the injection mould 25. The mirror blocks 11, 12 are in each case fitted into a centering ring 13 and 14, respectively, concentrically surrounding them. The information is stamped into the injection-moulded part (the CD) during the injection moulding by means of a stamper 19, which, as a thin disc, bears against the moulding surface of the second mirror block 12 and is held in the center by a bushing-shaped stamper holder 18. For the connection of the injection-moulding tool 10 to the nozzle of the injection-moulding machine (not represented), a screw bush 17 reaching through the center of the second mirror block 12 into the injection mould 25 and opening conically outwards is provided.

Arranged opposite the sprue bush 17, lying concentrically in one another and (indicated by the double-headed arrows) movable in relation to one another, are an ejector sleeve 16, a punch 15 and a sprue ejector 23. With the sprue ejector 23, the sprue 22 remaining in the inner bore of the sprue bush 17 can be ejected. With the punch 15, the central opening in the injection-moulded CD is punched out. With the ejector sleeve 16, finally, the finished CD can be ejected after the injection mould 25 has been opened.

The form ring 20 is displaceably mounted in the centering ring 13 and is pressed by springs (not represented) in the direction of the second mirror block 12. It can be withdrawn by means of a pneumatically driven actuating element 24. According to the invention, the form ring 20 does not bear with its inner side directly against the outer side of the first mirror block 11 but is separated from the latter by a sliding ring 21, which rests concentrically on the outer side of the first mirror block 11 in an offset provided for this purpose. The sliding ring 21 essentially has the form of a hollow cylinder and preferably consists of copper, a copper alloy such as bronze or else a plastics material such as Teflon. It consequently forms for the form ring 20, consisting of steel, and the first mirror block 11, consisting of steel, a sliding bearing with good thermal conduction, which ensures improved heat removal in the edge region of the injection mould 25 and consequently ensures improved optical and electrical values in the outer region of the CD. On account of the good sliding properties, a relatively close fit can be chosen between the sliding ring 21 and the first mirror block 11, so that the formation of flash between the mirror block 11 and form ring 20 is significantly reduced.

In addition to the advantages already set out with regard to the quality which can be achieved, the introduction of the sliding ring 21 makes possible an additional degree of freedom in the shaping of the injection-moulded CD, because one of the end faces of the sliding ring is part of the injection mould. This advantage can be explained with reference to FIGS. 2 to 4, the Subfigures (c) in each case showing the cross-sectional form of the sliding ring used, and the Subfigures (a) and (b) in each case showing the resultant edge forms for a CD (Subfigure a) and for a DVD composed of two part-discs (Subfigure b).

Figure 2:
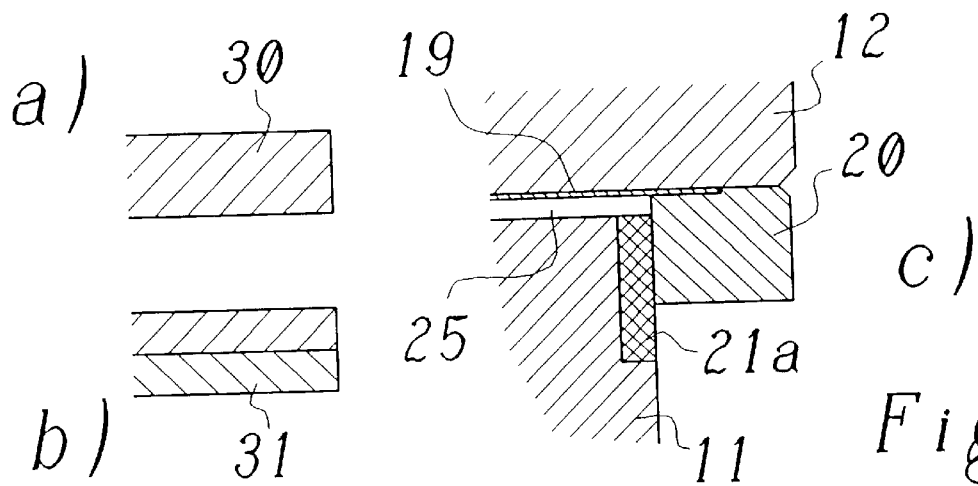
FIG. 2 shows a first exemplary embodiment of a sliding ring according to the invention with a flush-adjoining end face (FIG. 2c) and the edge regions of a resultant finished CD (FIG. 2a) or DVD (FIG. 2b)

In the case of FIG. 2, the end face of the sliding ring 21a facing the injection mould 25 is planar and adjoins the first mirror block 11 in such a way that it is flush with it. The underside of the finished CD 30 (FIG. 2a) and the upper side and underside of the finished DVD 31 (FIG. 2b) are correspondingly formed in such a way that they are planar up to the outer edge.

Figure 3:
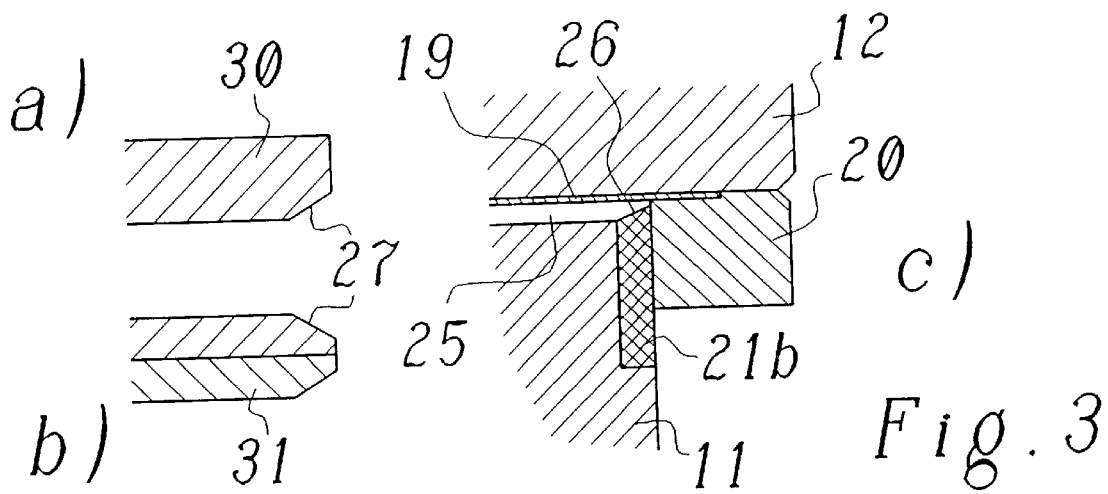
FIG. 3 shows a second exemplary embodiment of a sliding ring according to the invention with a bevelled end face (FIG. 3c) and the edge regions of a resultant finished CD (FIG. 3a) or DVD (FIG. 3b)

In the case of FIG. 3, the end face of the sliding ring 21b facing the injection mould 25 is configured as a bevel 26. The underside of the finished CD 30 (FIG. 3a) and the upper side and underside of the finished DVD 31 (FIG. 3b) are correspondingly provided with a chamfer 27 at the outer edge.

Figure 4:
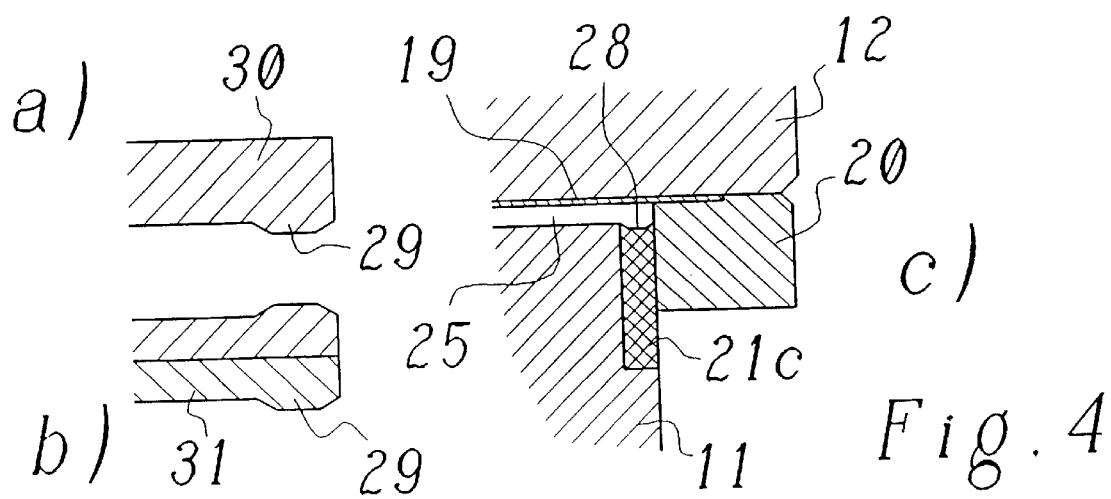
FIG. 4 shows a third exemplary embodiment of a sliding ring according to the invention with a peripheral depression in the end face (FIG. 4c) and the edge regions of a resultant finished CD (FIG. 4a) or DVD (FIG. 4b).

In the case of FIG. 4, finally, the end face of the sliding ring 21c facing the injection mould 25 is formed as a peripheral depression 28. The underside of the finished CD 30 (FIG. 4a) and the upper side and underside of the finished DVD 31 (FIG. 4b) are correspondingly provided at the outer edge with a scratch guard 29 in the form of an annular bead.

It goes without saying that other forms can also be produced in the edge region of the finished CD or DVD by different forms of shaping for the sliding ring 21.

Altogether, the invention provides an injection-moulding tool for the production of information carriers in disc form (CDs, DVDs etc.) which is distinguished by the following properties and advantages:

improved sliding properties between mirror block and form ring;

greater functional window when there is a varying temperature difference between mirror block and form ring;

improvement in optical quality on the substrate of the information carrier, specifically in the outer region;

improved cooling properties on the outside and, as a result, better optical and electrical values in the outer region of the information carrier;

new geometries possible (chamfering, scratch guard etc.);

reduction in the formation of flash between mirror block and form ring.

LIST OF DESIGNATIONS

10 injection-moulding tool
11,12 mirror block
13,14 centering ring
15 punch
16 ejector sleeve
17 sprue bush
18 stamper holder
19 stamper
20 form or venting ring
21,21$a,b,c$ sliding ring
22 sprue
23 sprue ejector
24 actuating element (form ring)
25 injection mould (cavity)
26 bevel
27 chamfer
28 depression (peripheral)
29 scratch guard
30 CD
31 DVD

What is claimed is:

1. Injection-moulding tool for the production of information carriers in disc form, which injection-moulding tool comprises for the forming of an injection mould a first and a second mirror block, which lie opposite each other and are movable in relation to each other for opening and closing the mould, and also a form ring, which concentrically encloses the first mirror block and closes off the injection mould on an outer edge and is movable in relation to the first mirror block, a separate sliding ring for reducing the friction between the form ring and the first mirror block when there is a movement of the form ring in relation to the first mirror block being provided between the first mirror block and the form ring enclosing it, characteriezed in that the separate sliding ring is arranged concentrically between the first mirror block and the form ring enlcosing it.

2. Injection moulding tool according to claim 1, characterized in that the sliding ring consists of a material reducing the sliding friction.

3. Injection moulding tool according to claim 2, characterized in that the sliding ring consists of one of copper, a copper alloy and a plastics material.

4. Injection moulding tool according to one of claims 1 to 3, characterized in that the first mirror block bounds the injection mould with an essentially planar surface, and in that the sliding ring adjoins the planar surface of the first mirror block with its end face facing the injection mould in such a way that it is flush with it, and enlarges it towards the outside.

5. Injection moulding tool according to one of claims 1 to 3, characterized in that the first mirror block bounds the injection mould with an essentially planar surface, and in that the sliding ring has a bevel on its end face facing the injection mould in such a way that the information carrier produced in the injection mould has a chamfer at its outer edge.

6. Injection moulding tool according to one of claims 1 to 3, characterized in that the first mirror block bounds the injection mould with an essentially planar surface, and in that the sliding ring has a peripheral depression on its end face facing the injection mould in such a way that the information carrier produced in the injection mould has an elevated, annular scratch guard at its outer edge.

7. Injection moulding tool according to one of claims 1 to 3, characterized in that the sliding ring rests on the first mirror block.

8. Injection moulding tool according to one of claims 1 to 3, characterized in that the sliding ring is provided with a friction-reducing coating.

9. Injection moulding tool according to claim 1, wherein the disc form is one of a CD and a DVD.

10. Injection moulding tool according to claim 2, characterized in that the sliding ring consists of polytetrafluoroethylene.

11. Injection moulding tool according to claim 1, wherein the form ring is movable with respect to the sliding ring.

12. Injection moulding tool according to claim 1, further comprising a punch for punching a central opening in the carrier disc, and an ejector sleeve between the first mirror block and the punch, where the ejector sleeve ejects the carrier disc after the injection mould has been opened.

* * * * *